(12) United States Patent
Lai et al.

(10) Patent No.: US 11,644,616 B1
(45) Date of Patent: May 9, 2023

(54) DISPLAY COVER HAVING A WINDOW

(71) Applicant: Darwin Precisions Corporation, Hsinchu County (TW)

(72) Inventors: Yu Jen Lai, Hsinchu County (TW); Jung-Chih Tsai, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/989,137

(22) Filed: Nov. 17, 2022

(30) Foreign Application Priority Data

Nov. 18, 2021 (TW) .................................. 110142981

(51) Int. Cl.
*F21V 8/00* (2006.01)
(52) U.S. Cl.
CPC ........... *G02B 6/0091* (2013.01); *G02B 6/002* (2013.01)
(58) Field of Classification Search
CPC ....... G02B 6/002; G02B 6/0091; G09F 13/04; G09F 13/0409; G09F 13/049
See application file for complete search history.

(56) References Cited

U.S. PATENT DOCUMENTS

| 2013/0100647 A1* | 4/2013 | Sherman | ................. G09F 13/04 264/1.27 |
| 2022/0252778 A1* | 8/2022 | Taniguchi | ............... G09F 13/18 |

FOREIGN PATENT DOCUMENTS

| TW | 504602 B | 10/2002 |
| TW | I224230 B | 11/2004 |
| TW | M265634 U | 5/2005 |
| TW | M356172 U | 5/2009 |
| TW | 201410435 A | 3/2014 |

\* cited by examiner

*Primary Examiner* — Karabi Guharay
(74) *Attorney, Agent, or Firm* — WPAT, P.C

(57) ABSTRACT

The present invention provides a display cover, which includes a light transmission layer, a window pattern disposed on the light transmitting layer, at least one light source disposed on the light transmission layer or the window pattern, and a light conduction layer disposed on the light transmission layer to cover the window pattern and the at least one light source. The window pattern is designed corresponding to a predetermined pattern, so as to define a light transmission window of the predetermined pattern in the light transmission layer. Moreover, at least one light guide structure is disposed on one side of the light conduction layer facing away from the light transmission layer. The at least one light guide structure is configured to at least partially guide light emitted from the at least one light source to the light transmission window.

13 Claims, 8 Drawing Sheets

S1

S2

S3

DISPLAY COVER HAVING A WINDOW

CROSS-REFERENCE TO RELATED APPLICATION

This application claims the priority benefit of Taiwan application serial No. 110142981, filed on Nov. 18, 2021. The entirety of the above-mentioned patent applications is hereby incorporated by reference herein and made a part of this specification.

BACKGROUND

Technical Field

The present invention is related to a display cover. More specifically, the present invention is related to a display cover with a light conduction layer covering an illuminant.

Related Art

Display covers used for displaying specific information and patterns can be widely applied to a variety of fields. For examples, display covers can be applied to a variety of display screens or illuminant devices, such as decoration lamps, atmosphere lamps, lighting fixtures, automotive covers, dashboards of appliances, panels of medical instruments, etc. However, in addition to main structure of a cover, other parts such as circuit boards for illuminant display covers and illuminant, are also provided in a display cover and result in bulky appearance of a display cover which occupies undesired space and has unwanted weight. Furthermore, cost and working hours for assembling display covers are increased corresponding to numerous assembly parts and multiple assembly process. Therefore, improved display covers with compact size for displaying specific information or patterns are desirable.

SUMMARY

Technical Means for Solving Problems

To solve the problems mentioned above, according to one embodiment of this invention, a display cover is provided, which includes: a light transmitting layer; window patterns, corresponding to design of predetermined patterns and defining a light transmitting windows with the predetermined patterns on the light transmitting layer; at least one light source, provided above the light emitting layer or the window patterns; and a light conduction layer provided above the light transmitting layer and covering the window patterns and the at least one light source. There is at least one light guide structure provided at one side of the light conduction layer, which is facing away the light transmitting layer, and is configured to at least partially guide light emitted from the at least one light source to the light transmitting window.

Compared to prior art, the display cover shown by the embodiments of the present application eliminates needs of providing light source or electrical circuit boards above the light conduction layer, and decreases overall thickness or weight of the display cover.

DETAILED DESCRIPTION

The following description illustrates variety of embodiments, and people skilled in the related art may easily understand spirit and principles of the present invention by referring the description with the accompanied drawings. Although some specific embodiments are described in detail, they are only exemplary for illustration and not for limitation to the present invention. Therefore, variation and modification may be obvious and easily achieved by people skilled in the art under the scope and the spirit of the present invention.

Figure 1:
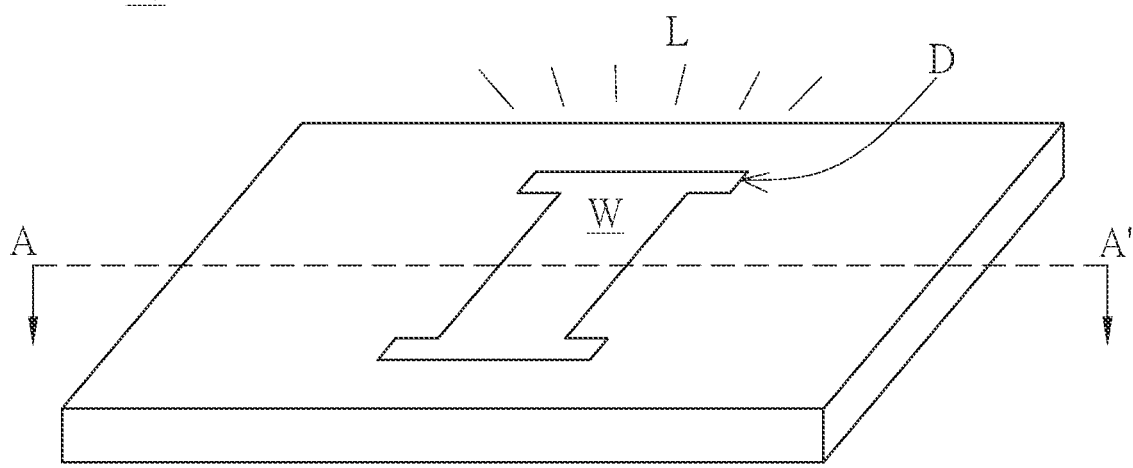
FIG. 1 is a perspective view of a display cover according to one embodiment of the present invention.
Figure 2:
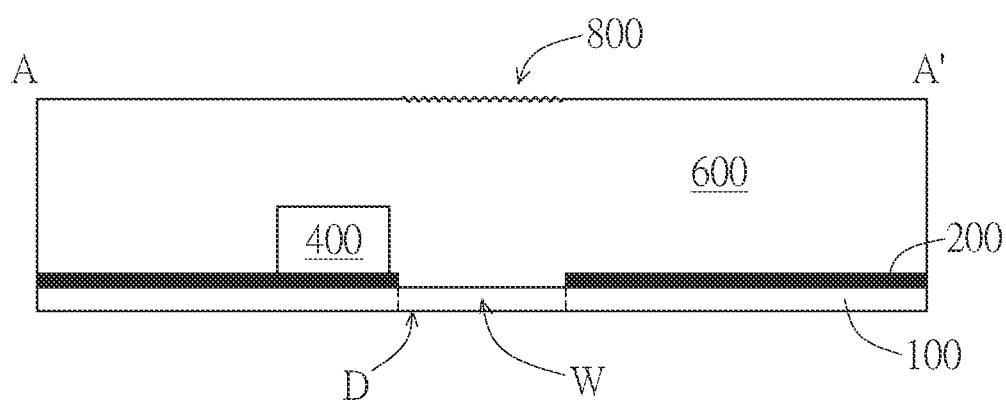
FIG. 2 is a cross-sectional view along the cross-section line A-A' shown in FIG. 1.

Referring to FIG. 1 and FIG. 2, which are a perspective view and a cross-sectional view that illustrate a display cover 10 of the present invention. The display cover 10 is used for showing a predetermined pattern D. The predetermined pattern D can be changed to any letters, shapes or figures, and the "I" character is only for example, and not for limitation to the present invention. The display cover 10 shows a predetermined pattern D through a light transmitting window W lighten by light ray L, and the predetermined pattern D can be applied to all scenarios requiring the predetermined pattern D. For instance, the predetermined pattern D can be applied to decorative lamps, mood lamps, lighting lamps, vehicle covers, electrical instrument panels, medical instrument panels and other light signal display screens or lighting fixtures for displaying predetermined patterns D.

Now referring to FIG. 2, according to this embodiment, the display cover 10 may comprise a light transmission layer 100, a window pattern 200 disposed on the light transmission layer 100 which is corresponding to a predetermined pattern D design, at least one light source 400 disposed on the light transmission layer 100 or the window pattern 200, and a light conduction layer 600 disposed on the light transmission layer 100 and covering the window pattern 200 and the at least one light source 400.

Specifically, the light transmission layer 100 could be any transparent film layer, for example, transparent and decorative thin films used to maintain integrity or consistency of appearance of an object. The transparent and decorative thin films could be made of one of the following materials: Polycarbonate (PC), Polyethylene terephthalate (PET), poly (methyl methacrylate) (PMMA), Polyimide (PI), and Acrylonitrile Butadiene Styrene (ABS). Compared to the light transmission layer 100 having the window pattern 200 with lower light transmittance, components sprayed in black or dark ink can be disposed on the light transmission layer 100 to shield areas external to the predetermined pattern D. Thereby, the light transmission window W with the predetermined pattern D can be defined on the light transmission layer 100.

As noted above, referring to FIG. 3 in conjunction with FIG. 2, at least one light source 400 could be disposed on the light transmission layer 100 or the window pattern 200 and configured to emit light L. For example, the at least one light source 400 could be LEDs, organic light-emitting elements, electroluminescent elements, etc. However, the invention is not limited the manner described above.

According to some embodiments, in order to let people outside hardly perceive the existence of the light source 400, the light source 400 may be disposed on a side of the window pattern 200 facing away from the light transmission layer 100. However, the present invention is not limited to the manner described above.

The light conduction layer 600 disposed to overlap the window pattern 200 and the at least one light source 400 could be, for example, a plastic module. According to some embodiments, the above-mentioned window pattern 200 and the above-mentioned at least one light source 400 could be embedded in the light conduction layer 600. Therefore, when the at least one light source 400 illuminates, the light L could be directly incident into the light conduction layer 600 for conduction without entering the light conduction layer 600 through the interface between different media. Therefore, loss rate of the light L emitted by the light source 400 could be reduced or avoided. In other words, deflection of the light L possibly emitted by the light source 400 through different media could be reduced or avoided.

According to some embodiments, the light L emitted by the light source 400 could be directly incident into the light conduction layer 600, and is conducted or diffused in the light conduction layer 600 based on structural and shape changes (for example, total reflection in the light conduction layer 600 of the plastic module, but not limited to this) to increase light diffusivity or uniformity. Therefore, there is no need for additional diffusion components or media layers. In addition, when passing through different media, light loss/reduction of transmitted light at the interface of the media caused by diffusion members could also be reduced or avoided.

Specifically, as shown in FIG. 2, one side of the light conduction layer 600 which is facing away from the light transmission layer 100 could have at least one light-guiding structure 800. Thereby, further referring further to FIG. 3 with combination with FIG. 2, at least one light-guiding structure 800 could be configured to at least partially guide the light L emitted by the light source 400 to the light transmission window W of the predetermined pattern D. In this way, uniformity and brightness of the emitted light could be effectively improved, and irradiating distance could be increased (for example, toward the expected light-emitting direction of the light transmission window W or an extending direction of the light conduction layer 600). In the meantime, numbers or power of the installed light source 400 could be reduced. Therefore, when a predetermined device or a predetermined scenario provided with the display cover 10 that emits light, one observer on the side of the light transmission layer 100 which faces away from the light conduction layer 600 could see the predetermined pattern D displayed by the emitting display cover 10.

Therefore, based on the light guide structure 800 formed on the light conduction layer 600 and the light source 400 covered by the light conduction layer 600, a light and compact display cover 10 could be provided through a simplified and integral structure. Furthermore, the display cover 10 of the present embodiment reduces or avoids possible loss and variation of light emitted through different media because there are less or no additional circuit boards or light emission elements attached to the light conduction layer 600. Thereby, efficiency, accuracy and stability of light emission and/or light guiding of the display cover 10 can be obtained under this simplified structure disclosed by the embodiment.

Figure 3:
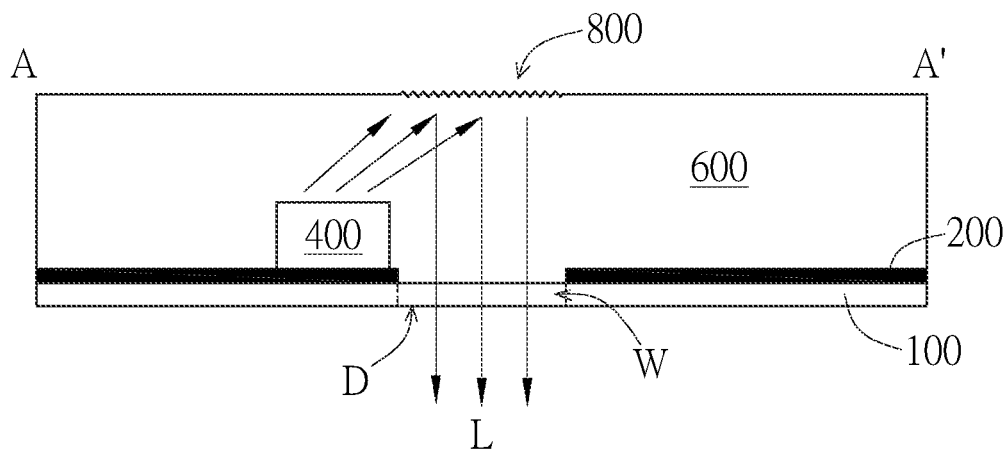
FIG. 3 illustrates that the light guide structure directs light toward the light transmitting window according to one embodiment of the present invention.

In the illustration shown in FIG. 2 and FIG. 3, the light source 400 could be a single front-emitting LED. However, the elements described above are not limitation to the present invention. Variety kinds of LEDs, such as laterally emitting LEDs, wide-angle/full-angle LEDs could be provided. Alternatively, different light sources other than LEDs may also be provided. As mentioned above, examples shown and described here are only for illustration and not for limitation to this invention.

Figure 4:
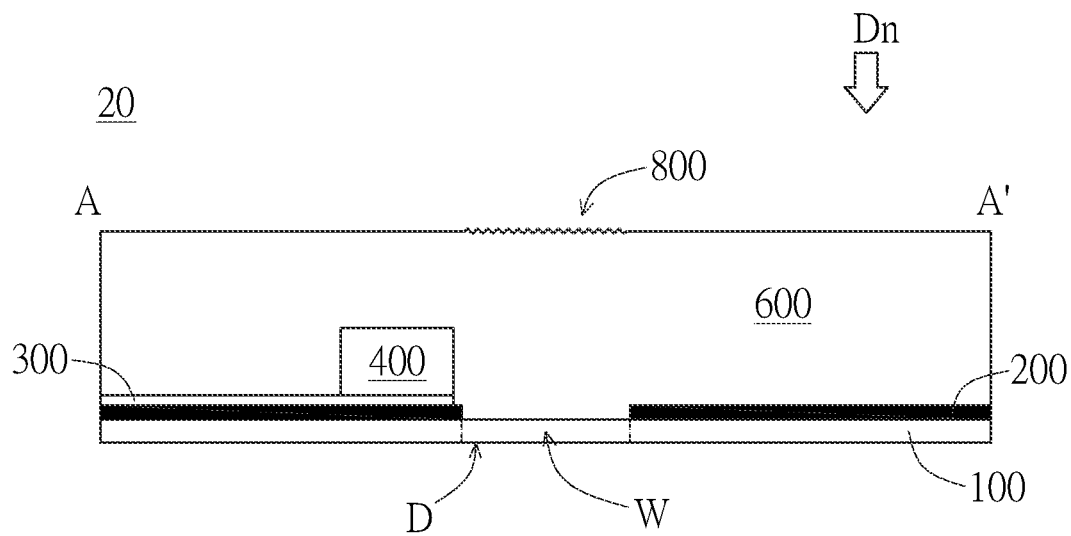
FIG. 4 is a cross-sectional view illustrating a display cover according to another embodiment of the present invention.
Figure 5:
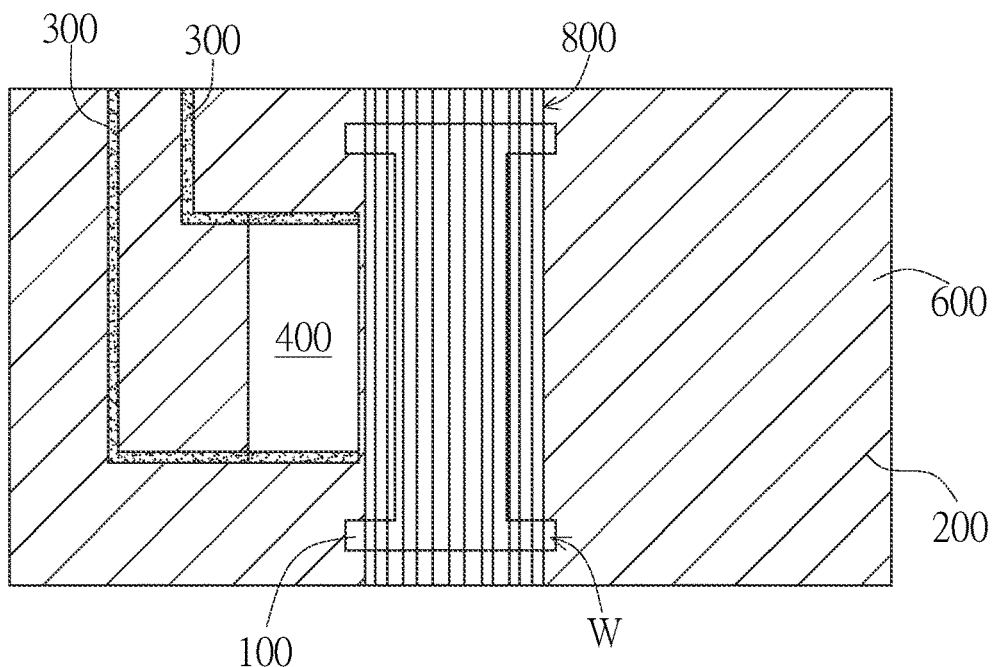
FIG. 5 is a top view illustrating parts of the display cover according to another embodiment of the present invention.

Next, referring to FIG. 4 with FIG. 5, which is a top view from the direction Dn of FIG. 4, the display cover 20 may substantially further include a conductive pattern 300 disposed on the light transmission layer 100 or a window pattern 200 according to another embodiment of the present invention. Specifically, in order to reduce or avoid additionally attached circuit boards, the circuit configuration and/or circuit design corresponding to the at least one light source 400 can be directly formed on the light transmission layer 100 in a form of a conductive patterns 300, or formed on the window pattern 200. Thereby, at least one light source 400 can be electrically connected to the conductive pattern 300 and can be turned on to emit light.

According to some embodiments, the conductive pattern 300 could be disposed on one side of the window pattern 200 which is facing away from the light transmission layer 100. An observer on the side of the light transmission layer 100 which is facing away from the light transmission layer 600 hardly perceives the conductive pattern 300 because of the shielding of the window pattern 200. However, the elements described above are not limitation to the present invention. For example, when the conductive pattern 300 is made of a light transmission material, the conductive pattern 300 could extends from the window pattern 200 to the light transmission window W provided on the light transmission layer 100 without being detected by an outside observer. In this embodiment, for example, the conductive pattern 300 could have a touch function to be touched by an outside observer. In addition, similar to the window pattern 200 and the at least one light source 400, the conductive pattern 300 may be covered by the light conduction layer 600. For example, the conductive pattern 300 can be embedded in the light conduction layer 600.

Next, a method of manufacturing a display cover according to some embodiments of the present invention will be described with reference to FIG. 6 to FIG. 7C.

Figure 6:
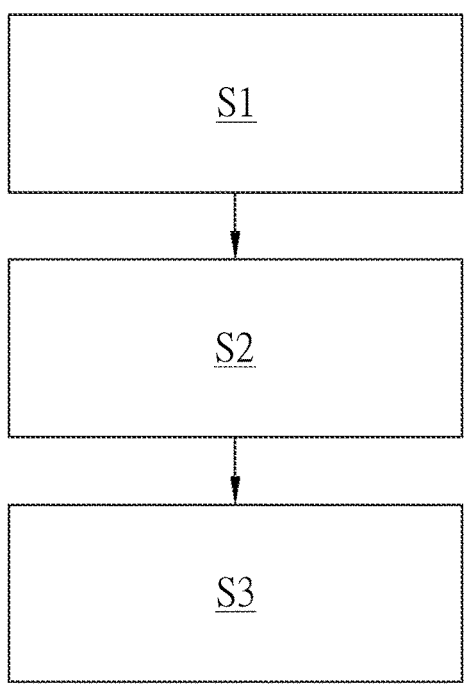
FIG. 6 is a process illustrating the manufacturing method for the display cover according to another embodiment of the present invention.

Referring to FIG. 6, a method 1000 manufacturing a display cover according to an embodiment of the present invention sequentially includes step S1, step S2 and step S3.

Figure 7A:
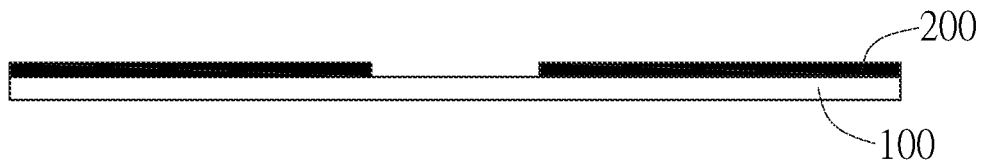
FIG. 7A-FIG. 7C illustrate steps of the foregoing manufacturing method for the display cover according to another embodiment of the present invention.

Referring to FIG. 7A, in step S1, a light transmission layer 100 could be provided firstly. Then, dark material such as dark ink is printed or coated on the light transmission layer 100 corresponding to a desired pattern, and thereby the window pattern 200 could be formed.

Figure 7B:
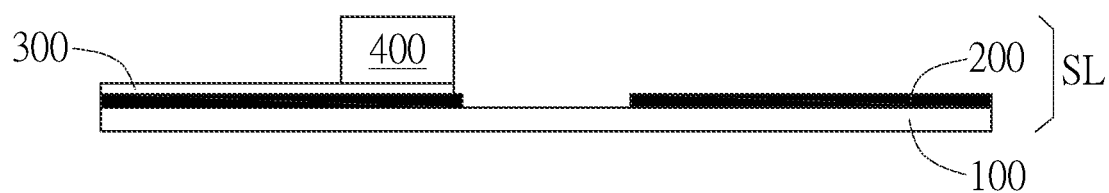
Figure 7C:
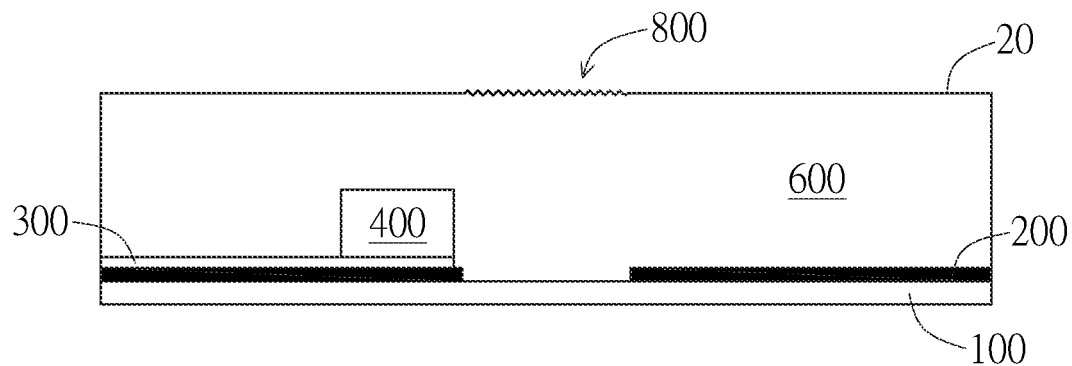

Next, referring to FIG. 7B, in step S2, at least one light source 400 such as an LED patch and a conductive pattern 300 corresponding to circuit employment and design of the light source 400 could be disposed on the light transmission layer 100 or on the window pattern 200. Specifically, the conductive pattern 300 could be formed by printing or coating a conductive ink, such as conductive silver paste, on the light transmission layer 100 or the window pattern 200. The light source 400 could also be disposed on the light transmission layer 100 or on the window pattern 200, and could be electrically connected to the conductive pattern 300. For example, the conductive pattern 300 could be made by screen printing with a conductive ink, such as conductive silver paste, having a line width of 0.2~1 mm and a thickness of 3~10 um (could be adjusted based on source current of light/the characteristics of the conductive ink such as conductive silver paste/printing parameters). According to some embodiments, in order to prevent outside observers from unexpectedly perceiving the conductive pattern 300 and the light source 400, the conductive pattern 300 and the light source 400 may be formed on the window pattern 200 without directly contacting the light transmission layer 100. However, the elements described above are not limitation to the present invention.

According to some embodiments, the above-mentioned conductive ink, such as conductive silver paste, could be high-temperature resistant conductive ink. For example, conductive ink with tolerance temperature up to 150° C. or above could be used. In addition, conductive silver paste could be used to electrically connect the conductive pattern 300 and the light source 400, and the conductive silver paste may also have tolerance of high temperature. For example, baking and curing during the temperature range of 60~150° C. (could be adjusted according to tolerance temperature of conductive materials, such as conductive ink/other components) could be performed. However, the elements described above are not limitation to the present invention. According to other embodiments, conductive materials, such as conductive inks with tolerance range of temperature 90-130° C. or with tolerance range of lower temperature 60-80° C., could also be used.

Based on the mentioned above, referring to FIG. 7C with combination of FIG. 7B, in the above-mentioned step S2, a completely assembled structure of the light transmission layer 100, the window pattern 200, at least one light source 400 and the selectively disposed conductive pattern 300 is a screen layer SL. For example, the screen layer SL could be a combination of an outside decorative film intended to be displayed externally and an inside thin film circuit and an inside light source. In step S3 shown in FIG. 7C, the screen layer SL could be disposed in a specific mold with injection of molten plastic to form the corresponding light conduction layer 600. That is, the display cover 20 could be injection-molded by injection of molding plastic on the screen layer SL to form a cured light conduction layer 600 by means of in-mold electronics. Thereby, one-piece molding could be accomplished, and the window pattern 200, the at least one light source 400 and the selectively disposed conductive pattern 300 cover are embedded in the integrated display cover plate 20 of the light conduction layer 600. According to other embodiments, in addition to injection molding, the light conduction layer 600 could sheathe the light source 400 by means of perfusion, so that the light L could be directly incident into the light conduction layer 600 for conduction.

According to some embodiments, the at least one light guide structure 800 formed on the side of the light conduction layer 600 which is facing away the light transmittance layer 100 could be transferred to the light conduction layer 600 corresponding to structure in the mold during in-mold electronic process. In this way, the light guide structure 800 could be accomplished by a relatively efficient procedure. Alternatively, according to other embodiments, the at least one light guide structure 800 could be formed by injection molding a semi-finished product of the display cover 20 of the cured light conduction layer 600, and then through subsequent processing such as etching, cutting, and attaching. In this way, the light guide structure 800 could be accomplished by few fixed molds. According to different embodiments of the present invention, process and details for forming the at least one light guide structure 800 are not limited to the aspects specifically shown in the specification and the drawings.

Hereinafter, a display cover having a light guide structure 800 according to various embodiments of the present invention will be described with further reference to FIG. 8A to FIG. 8F.

Figure 8A:
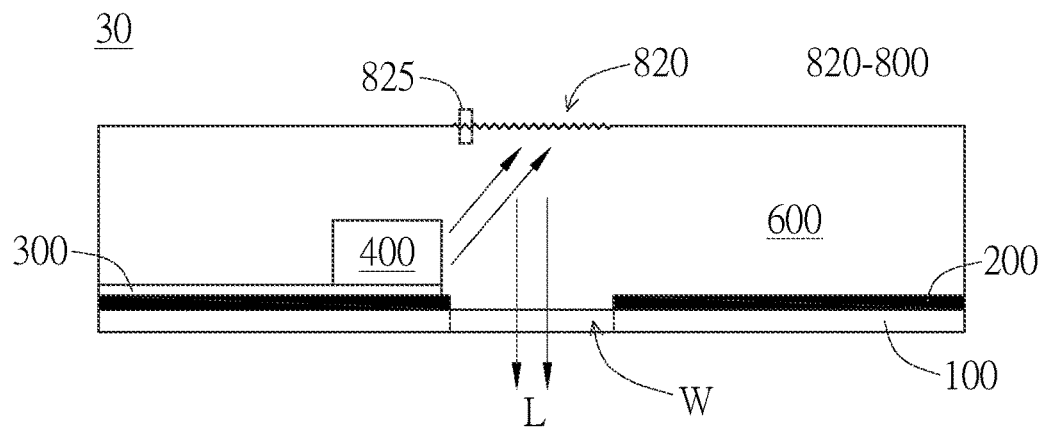
FIGS. 8A to 8F are schematically cross-sectional views of a display cover plate according to various embodiments of the present invention.

Firstly referring to FIG. 8A, according to one embodiment, at least one light guide structure 800 of the display cover 30 may include a microstructure 820 for reflecting and guiding light to the light transmission window W. The microstructure 820 could be any microstructures beneficial for reflecting light or guiding light to the light transmission window W. The microstructure 820 could be located on the light path of the light L emitted by the at least one light source 400. For example, the microstructure 820 may have a plurality of microstructure units 825 deployed to form concave and convex holes, such as sawtooth or wavy shape, and at least one light source 400 may be lateral-emitting LEDs. Thereby, light L could propagate to the microstructure 820 in the light conduction layer 600 and could be guided to the light transmission window W by reflection of the microstructure 820.

Figure 8B:
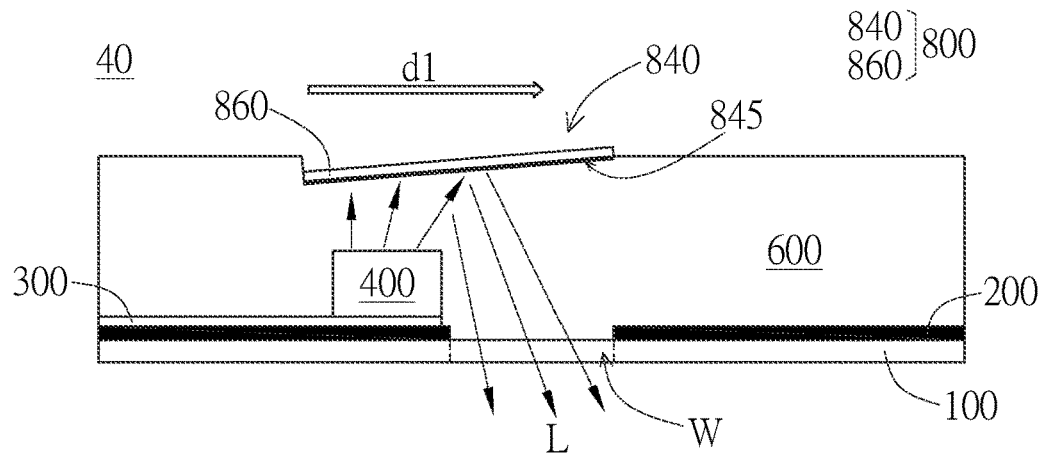

Next, referring to FIG. 8B, according to one embodiment, at least one light guide structure 800 of the display cover 40 may include an inclined surface structure 840 for reflecting and guiding light to the light transmission window W. The inclined surface structure 840 may define a reflective surface 845 facing interior of the light conduction layer 600. The reflective surface 845 faces the light transmission window W and is inclined relative to an extending direction d1 of the light conduction layer 600, so that it can reflect the light L from at least one light source 400. For example, the inclined surface structure 840 could be disposed that, relative to the reflective surface 845, the optical path of light L emitted by the at least one light source 400 and the incident angle into the reflective surface 845 are symmetrical to or corresponding to the optical path of light L reflected from the reflective surface 845 and the exiting angle. However, the elements and the structures described above are not limitation to the present invention. In addition, at least one light source 400 may be a front-emitting LED to emit light toward the inclined surface structure 840. Thereby, the light L could propagate in the light conduction layer 600 to the inclined surface structure 840 and could be guided to the light transmission window W by reflection of the inclined surface structure 840.

According to some embodiments, as shown in FIG. 8B, at least one reflective layer 860 is disposed on the back surface of the at least one light guide structure 800 which is facing away the light transmission layer 100, and the at least one reflective layer 860 reflects light L emitted by at least one light source 400. Therefore, brightness of the emitted light could be improved. For example, in order to further enhance reflection of light L from the inclined surface structure 840 and reduce probability of light L escaping from the light conduction layer 600, at least one reflective layer 860 could be disposed behind the inclined surface structure 840. However, the elements and the structures described above are only for illustration, and are not limitation to the present invention. For example, the reflective layer 860 may not be provided, and light L may be simply reflected by the inclined surface structure 840.

Figure 8C:
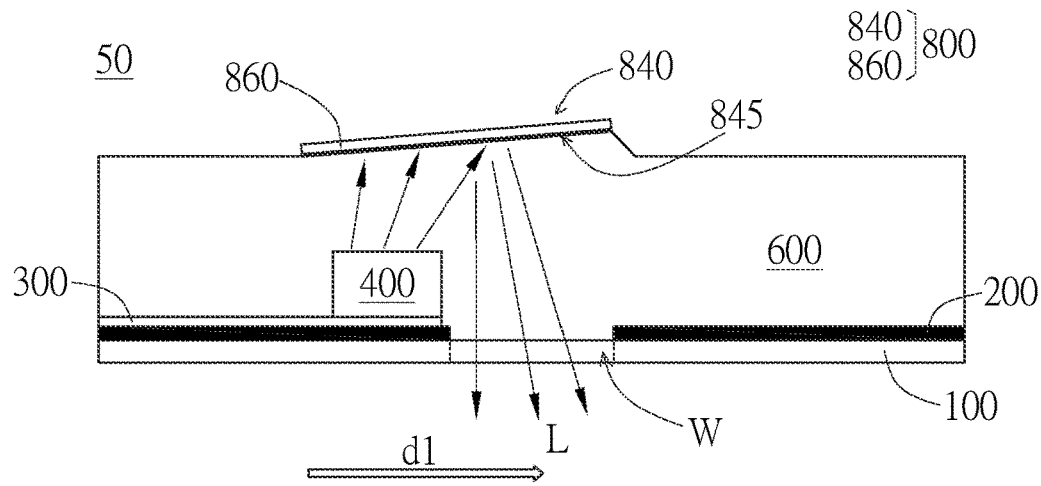
Figure 8D:
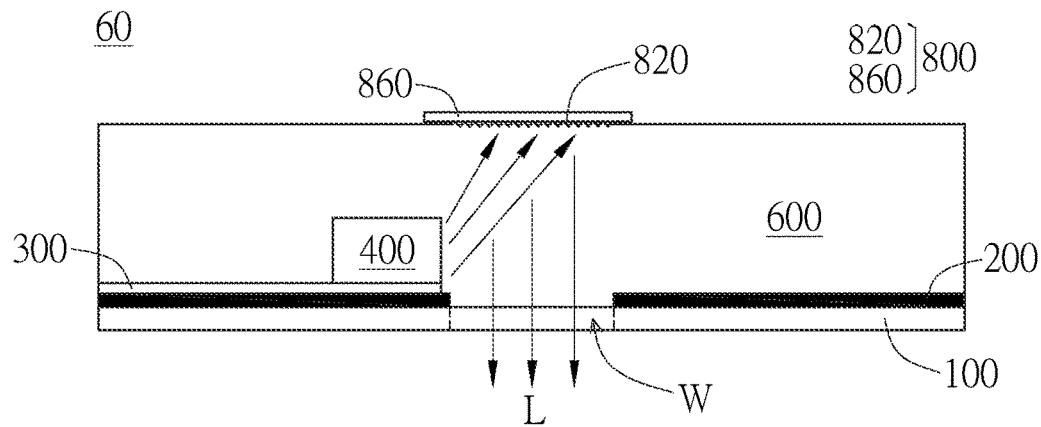

Referring to FIG. 8C, the display cover 50 could basically have the light guide structure 800 being similar to the structure shown in FIG. 8B. Difference between FIG. 8C and FIG. 8B is that the inclined surface structure 840 of FIG. 8B is recessed in the light conduction layer 600, and the inclined surface structure 840 in FIG. 8C is protruding from the light conduction layer 600. Various embodiments of the present invention could be understood through different aspects, and the light guide structure 800 could be manufactured flexibly according to various designs or manufacturing process. Various light guide structures 800 should be within the scope of the present invention.

As noted above, referring to FIG. 8D, according to the display cover 60 of one embodiment, the reflective layer 860 could also be disposed behind the microstructure 820 similar to that shown in FIG. 8A. In this way, reflection from the microstructure 820 and guiding light L by the microstructure 820 could be further enhanced, and probability of light L escaping from the light conduction layer 600 could be reduced or avoided.

Figure 8E:
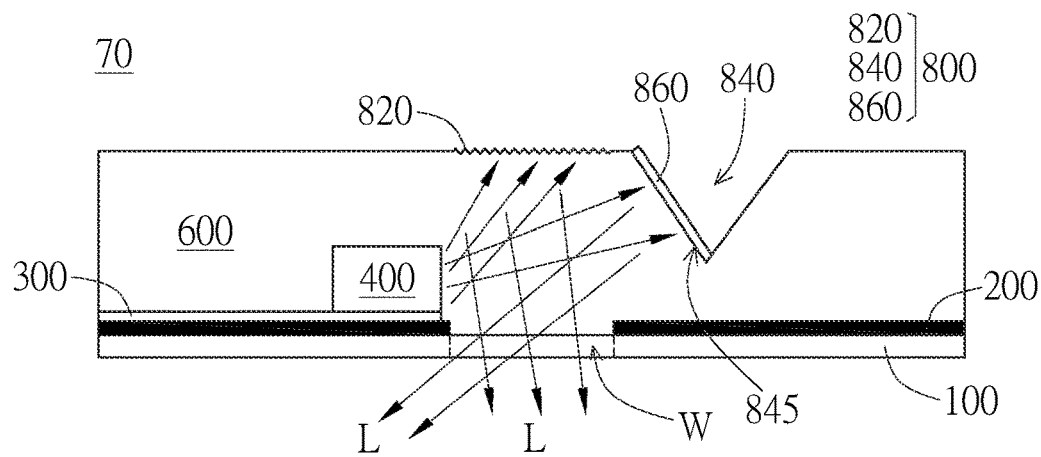

Further, referring to FIG. 8E, according to an embodiment, the light guide structure 800 of the display cover 70 may have various combinations of the above-mentioned structures. Specifically, as shown in FIG. 8E, the light guide structure 800 may include the above-mentioned microstructure 820, the inclined surface structure 840 and the reflective layer 860. The microstructure 820 could be disposed, for example, on one side of the light conduction layer 600 which is near the light source 400 and facing away the light transmission layer 100, and the inclined surface structure 840 could be disposed on one side of the light conduction layer 600 which is far from the light source 400 and facing away from the light transmission layer 100. Thus, the reflective surface 845 faces the light source 400 and the light transmission window W. In addition, the reflective layer 860 could be disposed on a backside of the inclined surface structure 840 to increase the reflection capability of the inclined surface structure 840 and reduce or prevent light L from unexpectedly exiting the light conduction layer 600. As mentioned above, various structures could be combined to direct light L in all possible directions or angles to the light transmission window W.

When the light source 400 and the inclined surface structure 840 are disposed on both sides of the light transmission window W, the light source 400 could be lateral-emitting LEDs emitting light L toward the inclined surface structure 840. However, the elements described above are not limitation to the present invention.

Figure 8F:
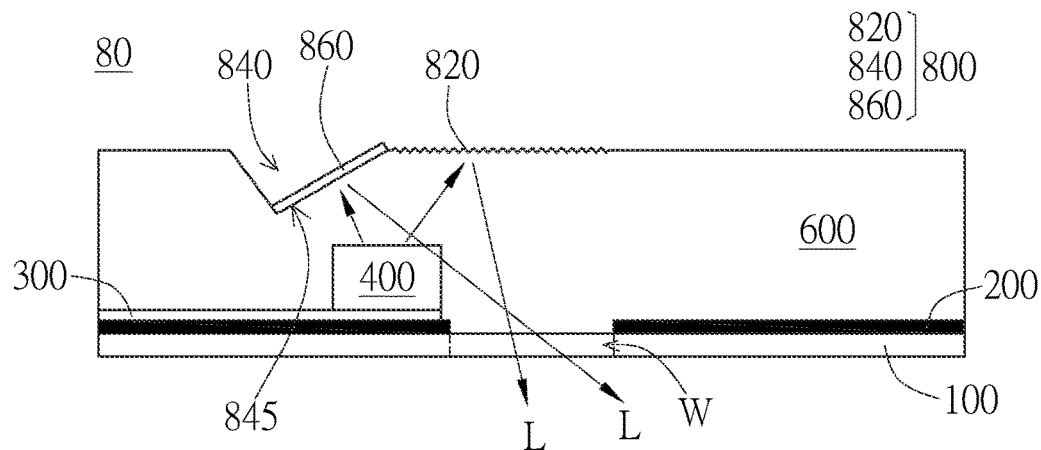

As mentioned above, according to another embodiment shown in FIG. 8F, the display cover 80 could also be used in combination with the above-mentioned various structures similar to the above-mentioned embodiment. For example, the light guide structure 800 could include the above-mentioned microstructure 820, the inclined surface structure 840, and the reflective layer 860 disposed behind the inclined surface structure 840. At least one light source 400 and the inclined surface structure 840 are oppositely disposed on one side of the light transmission window W, and the inclined surface structure 840 and the microstructure 820 are relatively near the front surface of the light source 400. Therefore, in this embodiment, at least one light source 400 may be front-emitting LEDs emitting light L toward the microstructure 820 and the inclined surface structure 840 disposed in the front.

According to some embodiments, wavelength of light L emitted by the at least one light source 400 changes after being reflected through the at least one reflective layer 860. For example, the reflective layer 860 could be reflective material with specific colors, and light L will change color after being reflected by the reflective layer 860. Thereby, characteristics of the light displayed by the display cover could be further adjusted.

Although the above-mentioned microstructures 820 are all disposed corresponding to the light transmission window W, the microstructures 820 may also be relatively disposed on the light conduction layer 600 on both sides of the light transmission window W, and appropriately reflect or guide light L to the light transmission window W based on small changes in shapes of the structures based on other embodiments. The aspects shown in this specification and the drawings are only for illustration, and are not limitation to the present invention.

As described above, with reference to the above-mentioned various aspects, people having ordinary knowledge in the related technical field should be able to understanding that the specific structure and combination of the light guide structure 800 could be adjusted based on different requirements. For example, the specifically detailed structure and configuration could be deployed and adjusted based on desired emitting range of the light transmission window W, desired light path, angles and directions of exiting light, and desired uniformity and intensity of illumination. Accordingly, exemplary aspects specifically illustrated in the description and drawings are not limitation to the present invention.

The above-mentioned microstructures 820 and the inclined surface 840 could be formed by, for example, shapes or structures of molds, or could be formed by etching or cutting after the light conduction layer 600 is formed. Additionally, the reflective layer 860 could be attached at the same time when the light conduction layer 600 is formed by lining on a specific part of the mold and injecting plastic into the mold, or the reflective layer 860 could be formed by being attached to the reflective layer 860 after the light conduction layer 600 is formed. As noted above, the display cover could be formed within the scope of the present invention, and the applicable manufacturing process and means are not limited to above mentioned. In addition, the proportions and relative proportions of each component shown in the drawings of the present application may be enlarged or highlighted for the sake of clear illustration. Therefore, people skilled in the related art should understand that the overall and actual proportions of the components of the display cover manufactured according to the embodiments of the present invention are not limited to the proportions specifically shown in the drawings.

Figure 9:
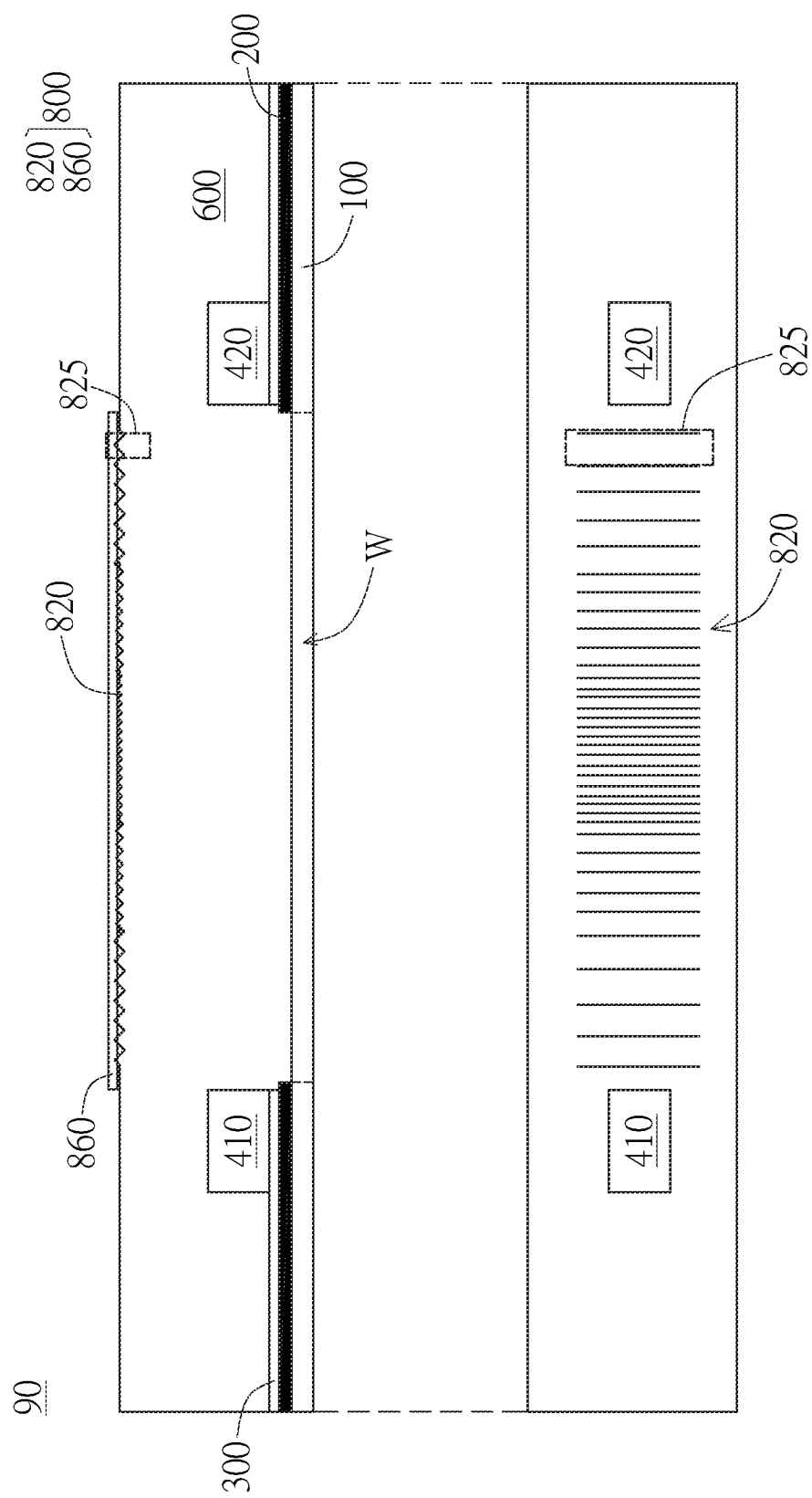
FIG. 9 illustrates the display cover according to another embodiment of the present invention.

Please refer to FIG. 9, the upper part in FIG. 9 shows a schematically cross-sectional view of the display cover 90, and the lower part in FIG. 9 shows a top view of relative deployment of the microstructures 820, the light sources 410 and 420 in the display cover 90. It should be noted that, in order to make the drawings be easily understood, some elements, such as the reflective layer 860, are not shown in the top view of FIG. 9. According to another embodiment of the present invention, the display cover 90 could have, for example, two light sources 410 and 420, which are disposed opposite on two sides of the light transmission window W, respectively. As noted above, in this embodiment, the light guide structure 800 may include the microstructure 820 and the reflective layer 860 selectively disposed on the back surface of the microstructure 820. When the plurality of microstructure units 825 of the microstructure 820 is distant from the light sources 410 and 420 (for example, closer to the middle of the light transmission window W), it has higher density. For example, when each microstructure unit 825 is far from the light source 410 or 420, spacing among each microstructure unit 825 could be smaller, or the size of the microstructure unit 825 itself could be smaller. Thereby, the microstructure units 825 with high density could increase reflection of light to compensate that less light is reflected when the microstructure units 825 is distant from the light source 410 or 420. Therefore, according to this embodiment, by using the microstructures 820 with different density, the light transmission window W or the display cover 90 with longer length could be achieved through less light sources (for example, through two light sources 410 and 420) without sacrifice of emitting efficiency and uniformity.

Because other details according to this embodiment are similar or identical to the embodiments described above, they will not be described here. Additionally, according to some embodiments, only one light source 410 may be provided, and the density of the microstructures 820 that are relatively far from the light source 410 could be increased (for example, the density is higher when the microstructures 820 are closer to the right). Alternatively, only one light source 420 may be provided, and density of the microstructures 820 that are relatively far from the light source 420 is increased (for example, the density is higher when the microstructures 820 are closer to the left). As noted above, people with ordinary knowledge in the related art should understand that numbers and position of the light sources, and density of the microstructures 820 could be adjusted accordingly under disclosure described above, and will not be described here.

Figure 10:
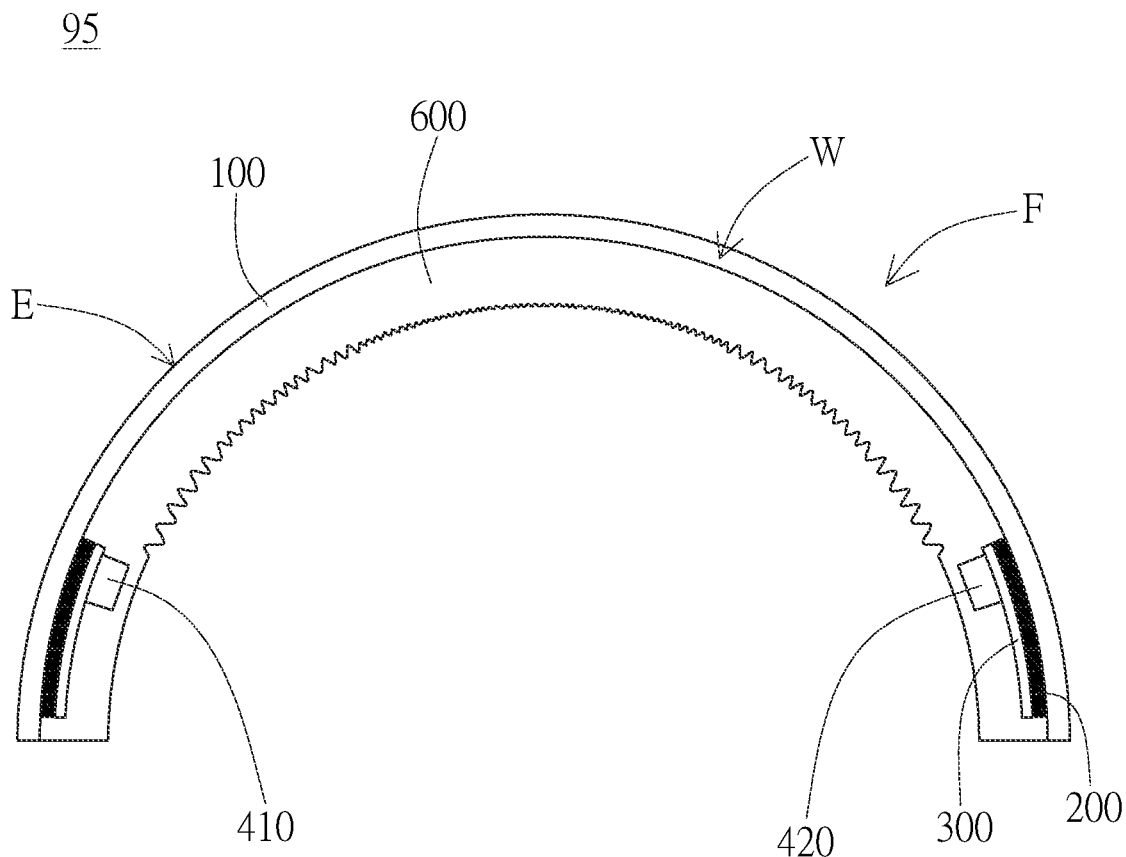
FIG. 10 is a cross-sectional view of the display cover according to another embodiment of the present invention.

Next, please refer to FIG. 10, according to another embodiment of the present invention, a display cover 95 is provided. The display cover 95 is integrally formed in a predetermined shape F, and light sources such as the light sources 410 and 420, the window pattern 200 and the selectively disposed conductive pattern 300 can be covered by the light conduction layer 600. For example, the predetermined shape F can be hemispherical or curved, and the structures of the light sources (such as the light sources 410 and 420), the window pattern 200 and the selectively disposed conductive pattern 300 could be embedded in the light conduction layer 600. However, the elements described above are not limitation to the present invention.

According to the principles of the present invention which are described above, the display cover 95 could be formed by integrally covering the respective components, thereby achieving effects of lightening, thinning and/or reducing the occupied space. Further, in addition to the rectangle, the display cover plate 95 could also be correspondingly designed to have different predetermined shapes F based on this thinning characteristic. Therefore, an outer surface E, formed in the predetermined shape F, which is disposed on the light transmission layer 100 of the display cover plate 95 which faces away from the light conduction layer 600 is not substantially flat. For example, the mold could be designed that the display cover plate 95 made by injection in the mold could have arbitrary shapes to adapt manufacturing of various structures for lighting, decoration or display. Therefore, according to the embodiments of the present invention, there is no need to provide or reduce the number of components to be assembled and stacked, as long as the light transmission window W in the light transmission layer 100 faces a predetermined direction (for example, it faces observers intended to use the display cover 95), the display cover 95 could be made as the predetermined shape F with various changes. As noted above, the display cover made as the predetermined shape according to the present invention is not limited to aspects specifically shown in this specification and the drawings.

As noted above, according to the display cover disclosed in the various embodiments of the present invention, overall weight and thickness of the display cover, and space occupied by the display cover could be reduced. Therefore, cost and process of stacking and assembling could also be reduced. Furthermore, since the light source is covered by the light conduction layer or integrated into the light conducting layer, light loss of light emitted by the light source which is resulted from entering the light conducting layer through different media could be reduced or avoided. Therefore, since light is directly incident to the light conductive layer, better emitting efficiency, display brightness and diffusion uniformity could be achieved. Additionally, according to some embodiments of the present invention, a 3D predetermined shape could also be obtained efficiently.

The above descriptions are only for preferred embodiments of the present invention. It should be noted that various changes and modifications could be made without departing from the spirit and principles of the invention. People with ordinary knowledge in the related field should understand that the present invention is defined by the scope of the appended claims, and various possible changes, such as substitution, combination, modification and diversion, are within the scope of the present invention under guidance of the present invention.

What is claimed is:
1. A display cover, comprising:
a light transmission layer;
a window pattern disposed on the light transmission layer corresponding to a predetermined pattern design, thereby a light transmission window of the predetermined pattern on the light transmission layer is defined;
at least one light source disposed on the light transmission layer or on the window pattern; and
a light conduction layer disposed on the light transmission layer, and covering the window pattern and the at least one light source;
wherein at least one light guide structure is provided on one side of the light conduction layer which faces away from the light transmission layer, and the at least one light guide structure is configured to at least partially direct the light emitted from the at least one light source to the light transmission window.

2. The display cover according to claim 1, wherein the window pattern and the at least one light source are embedded in the light conduction layer.

3. The display cover according to claim 1, further comprising a conductive pattern disposed on the light transmission layer or on the window pattern, and the conductive pattern is covered by the light conduction layer, and the at least one light source is electrically connected to the conductive pattern.

4. The display cover according to claim 3, wherein the conductive pattern is formed by printing or coating a conductive ink on the light transmission layer or the window pattern.

5. The display cover according to claim 3, wherein the conductive pattern is formed on the window pattern without directly contacting the light transmission layer.

6. The display cover according to claim 1, wherein the at least one light source is formed on the window pattern without directly contacting the light-transmitting layer.

7. The display cover according to claim 1, wherein the light transmission layer, the window pattern, and the at least one light source together form a screen layer, and the display cover is injection molded by injecting plastic material on the screen layer to form the light conduction layer through in-mold electronics.

8. The display cover according to claim 1, wherein the at least one light guide structure includes a microstructure, and the microstructure has a plurality of microstructure units arranged to form concave-convex holes, and provided in a light path of the at least one light source.

9. The display cover according to claim 8, wherein when the plurality of microstructure units is more distant from the at least one light source, the density of the plurality of microstructure units is higher.

10. The display cover according to claim 1, wherein the at least one light guide structure includes a sloped structure, the sloped structure defines a reflective surface facing inside of the light guide layer, and
wherein the reflective surface faces the light transmission window, and the reflective surface is inclined relative to an extending direction of the light conduction layer.

11. The display cover according to claim 1, wherein at least one reflective layer is disposed on the back of the at least one light guide structure which faces away from the light transmission layer, and the at least one reflective layer reflects light emitted by the at least one light source.

12. The display cover according to claim 11, wherein wavelength of the light emitted by the at least one light source changes after being reflected through the at least one reflective layer.

13. The display cover according to claim 1, wherein the display cover is integrally formed in a predetermined shape, and wherein outer surface of the light transmission layer formed in the predetermined shape which faces away from the light conduction layer is not substantially flat.

* * * * *